Feb. 1, 1949.                    J. R. FREI                         2,460,740
                                SEALING MEANS
                          Original Filed Feb. 12, 1942
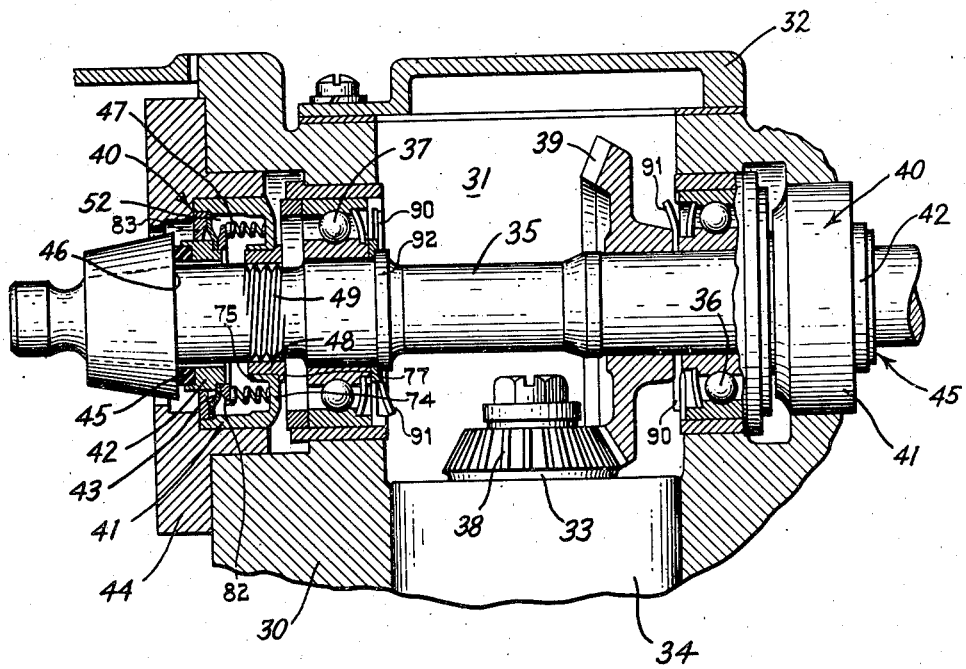
INVENTOR.
Jakob R. Frei
BY
F. Bascom Smith
ATTORNEY Patented Feb. 1, 1949

2,460,740

UNITED STATES PATENT OFFICE 2,460,740

SEALING MEANS

Jakob R. Frei, Sidney, N. Y., assignor to Bendix Aviation Corporation, New York, N. Y., a corporation of Delaware Original application February 12, 1942, Serial No. 430,554. Divided and this application October 31, 1944, Serial No. 561,236. In Canada December 4, 1942

4 Claims. (Cl. 308—187.1)

This invention relates to machine elements and more particularly to apparatus for preventing leakage to or from an enclosed space along a rotatable member extending through a wall of said space.

This application is a division of my co-pending application Serial No. 430,554, filed February 12, 1942, now matured into Patent Number 2,377,620, issued June 5, 1945, for "Magneto," and the subject matter of said prior filed application which is applicable to the disclosure of the present application is incorporated herein by reference.

One of the objects of the present invention is to provide novel sealing means for rendering a compartment or enclosed space substantially oil tight.

Another object is to provide novel means for effectively and efficiently preventing leakage through the walls of a compartment around rotating parts extending therethrough.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

The single figure of the accompanying drawings is a sectional view, with parts broken away, showing a portion of an apparatus such as a magneto generator embodying one form of the present invention.

Only a single embodiment of the invention is illustrated, by way of example, in the accompanying drawing, the same being shown as incorporated in a magneto generator for use in the ignition system of an internal combustion engine, or other similar structure. In the illustrated embodiment, a casing 30 is provided with a space or chamber 31 for lubricating oil or the like, one side of said space being closed by a cover plate 32. A shaft 33 which may be the rotor shaft of a magneto extends into the opposite side of chamber 31 and is surrounded by a suitable anti-friction bearing and oil seal which are shown diagrammatically at 34, said bearing and seal being similar to bearing 37 and seal 40 to be hereinafter described. A second shaft 35 extends in a normally horizontal position through chamber 31 and is supported by suitable bearings such as roller bearings 36, 37. Mounted on the upper end of shaft 33 is a beveled gear 38 which meshes with a similar gear 39 mounted intermediate the ends of shaft 35 for rotation therewith in chamber 31.

For the purpose of preventing an escape of liquid lubricating oil from chamber 31 along shaft 35, which oil is necessary for the lubrication of gears 38, 39 and the bearings for shafts 33, 35, a novel combination of oil sealing means is provided in the vicinity of each of the bearings for shafts 33 and 35. Each of the novel sealing means in the form illustrated comprises an outer cylindrical member or housing 41 having a press fit in a central opening in a cover plate 44 through which one end of shaft 35 extends. An inwardly extending radial flange 74 is formed on member 41 at the end thereof adjacent chamber 31 and has an inner cylindrical portion or member 75 attached thereto or formed integrally therewith, the latter member being disposed a short radial distance from the shaft. Secured by force fit in cylindrical portion 75 to have a sliding engagement with said shaft is a cylindrical member or sleeve 48 having an external shoulder 77 pressed against flange 74. The section of shaft 35 which is surrounded by and has a running clearance with sleeve 48 is preferably provided with a reverse spiral thread or groove 49 which, during rotation of the shaft in the direction in which it is designed to rotate, tends to drive any oil or other liquid trapped between said shaft and said sleeve along the shaft in the direction of compartment 31.

To trap the oil which escapes from chamber 31 into oil seal housing 41 and prevent the flow thereof from said housing along shaft 35 to the exterior of casing 30, particularly when the shaft is not rotating, a cylindrical member 42 is provided around the shaft, said member having a ring 45 of carbon or other suitable material secured in a fluid-tight manner in the end thereof remote from compartment 31. Ring 45 is adapted to engage an abutment or shoulder 46 formed on shaft 35 and rotatable therewith. Sliding fluid-tight contact between ring 45 and shoulder 46 is yieldably maintained by a plurality of circularly disposed springs 47 within housing member 41. As shown, springs 47 are spaced about the periphery of the shaft and one end of each spring bears against the flange 74 while the other end thereof presses against a flange member or ring 82 which is rigidly secured to ring 42.

An inwardly extending flange member 83 is secured in the end of housing 41 and serves to prevent the ejection of cylindrical member 42 from housing 41 when the oil seal assembly is removed from the shaft or when the shaft is removed from the casing. For sealing the annular space between member 42 and flange member 83, an annular sheet of flexible oil-proof and oil-resilient material 43 is suitably secured across said space, the inner periphery thereof being clamped between rings 42 and 82 and the outer periphery thereof being clamped between an internal shoulder in housing member 41 and ring or flange member 83. The leakage of oil from the space 52 within oil seal housing 41 is prevented by the diaphragm 43 and the continuous contact between the stationary carbon ring 45 and the rotating surface of shoulder 46 on the shaft. The burden of the seal at 45, 46 is substantially reduced by the reverse spiral 49 which cooperates with sleeve 48 to return oil to chamber 31 during rotation of shaft 35.

As a further precaution against the escape of oil from chamber 31 along shaft 35, an oil slinger 90 is mounted on the shaft for rotation therewith, said slinger being preferably located adjacent the inner end of bearing 37 so as to sling oil back into chamber 31 away from the bearing and thus reduce the amount of oil which would otherwise flow through the bearing to the oil sealing means heretofore described. Slinger 90 is formed from a flat ring having the inner periphery thereof clamped between a shoulder 92 formed on shaft 35 and the inner race of ball-bearing 37. The outer periphery of slinger 90 is radially slotted at suitable intervals and portions 91 thereof are bent to provide surfaces similar in nature to fan blades.

There is thus provided a novel structure whereby a lubricating oil chamber or the like into which rotating parts extend may be rendered substantially oil tight in a simple and effective manner. The novel combination of elements provided to insure a good oil seal is also such that partial failure may occur without permitting a rapid exit of lubricating oil and consequent failure of the entire structure. Additionally, the novel sealing means comprehended may be readily incorporated in a structure at relatively low cost.

Although only a single embodiment of the invention is illustrated and described, it is to be expressly understood that the same is not limited thereto. For example, roller or other types of bearings may be provided for the rotating shaft and various other types of oil seals may be employed in lieu of the seal comprising parts 41 and 42. Other changes may also be made in the design and arrangement of parts illustrated without departing from the spirit and scope of the invention as will now be understood by those skilled in the art. For a definition of the limits of the invention, reference is had primarily to the appended claims.

What is claimed is:

1. In apparatus having a substantially closed compartment and a rotatable shaft extending through the wall thereof, the combination with said shaft and wall of a roller bearing for journalling said shaft in said wall and sealing means for preventing the flow of oil from said compartment along said shaft comprising an oil slinger having fan-like blades attached to said shaft adjacent one side of said bearing, an annular oil seal surrounding said shaft and having rubbing contact therewith on the other side of said bearing, a member surrounding said shaft between said bearing and annular seal, and a reverse spiral groove on said shaft where said shaft passes through said member in which it has only a running clearance.

2. In apparatus having a substantially closed compartment and a rotatable shaft extending through a wall thereof, the combination with said shaft and wall of a substantially frictionless bearing for journalling said shaft in said wall and means for preventing the flow of lubricating oil from said compartment along said shaft comprising an oil slinger having fan-like blade portions attached to said shaft adjacent one side of said bearing and adapted to throw oil away from said bearing toward said compartment during rotation of the shaft, an annular oil seal surrounding said shaft and having rubbing contact therewith on the side of said bearing opposite said compartment, a member surrounding said shaft between said bearing and annular seal, and a reverse spiral groove on said shaft where it passes through said member in which it has only a running clearance.

3. In apparatus having a substantially closed compartment and a rotatable shaft extending through a wall thereof, the combination with said shaft and wall of a substantially frictionless bearing for journalling said shaft in said wall, means mounted in said wall exteriorly of said bearing, said means forming an annular chamber and having yieldable rubbing contact with said shaft to prevent the leakage of oil from said chamber, a spiral groove in a portion of said shaft between said chamber and said compartment, the grooved portion of the shaft having a running clearance in said first-named means, and an oil slinger mounted on said shaft for rotation therewith interiorly of and adjacent to said bearing.

4. In apparatus having a substantially closed compartment and a rotatable shaft extending through a wall thereof, the combination with said shaft and wall of a substantially frictionless bearing for journalling said shaft in said wall, means mounted in said wall exteriorly of said bearing, said means forming an annular chamber and having yieldable rubbing contact with said shaft to prevent the leakage of oil from said chamber, and a spiral groove in a portion of said shaft between said chamber and said compartment, the grooved portion of the shaft having a running clearance in said first-named means.

JAKOB R. FREI.

REFERENCES CITED

The following references are of record in the file of this patent:

UNITED STATES PATENTS

| Number | Name | Date |
|---|---|---|
| 1,208,045 | Swart et al. | Dec. 12, 1916 |
| 1,708,710 | Vincent | Apr. 9, 1929 |
| 1,722,489 | Bott | July 30, 1929 |
| 1,826,057 | Dobbins | Oct. 6, 1931 |
| 1,997,613 | Vroom | Apr. 16, 1935 |
| 2,000,293 | Morrow | May 7, 1935 |
| 2,077,881 | Gits | Apr. 20, 1937 |

FOREIGN PATENTS

| Number | Country | Date |
|---|---|---|
| 738,853 | France | 1932 |
| 518,916 | France | 1921 |